E. Waters. Sheet 1. 2 Sheets.
Making Paper Boxes.
No. 107.
12/2.
Reissued July 9, 1861.
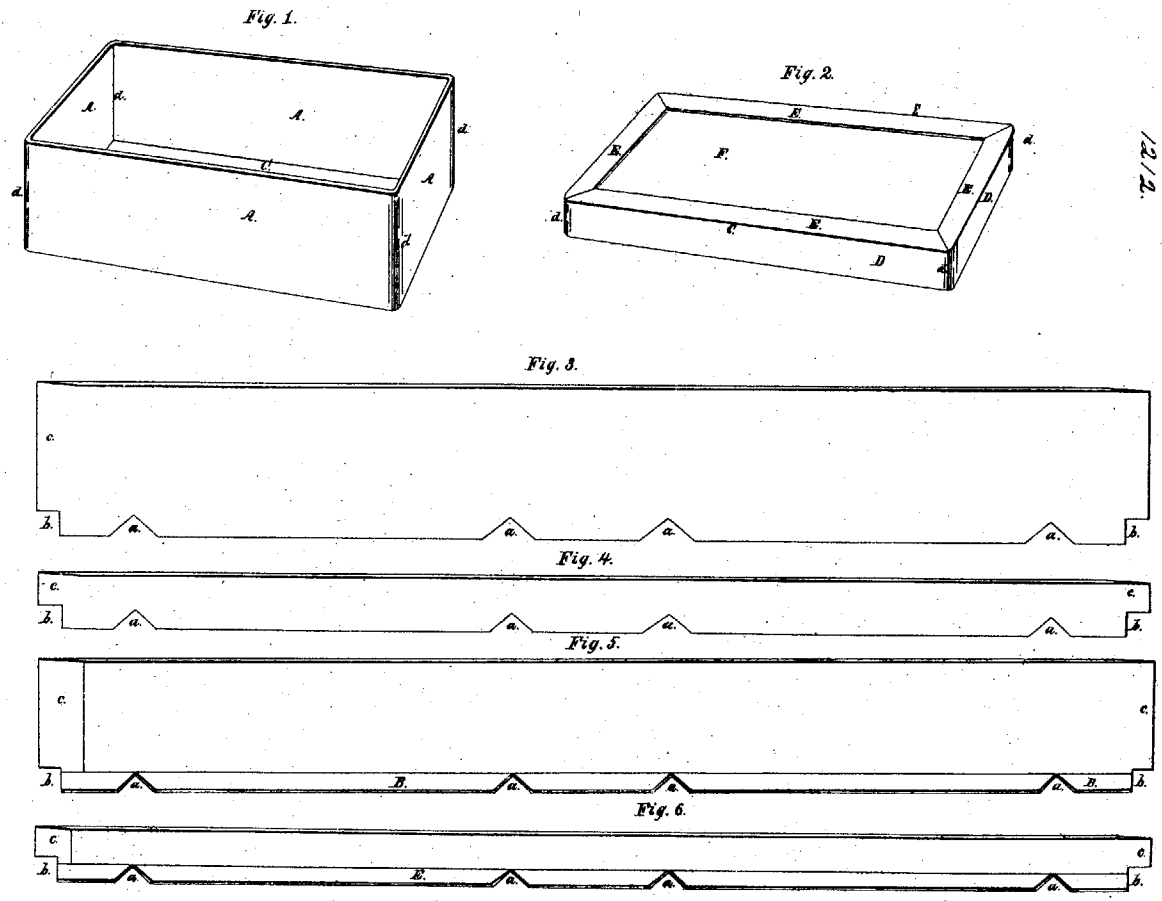

E. Waters. Sheet 2. 2 Sheets
Making Paper Boxes.
No. 107.
1212.
Reissued Jul. 9. 1861
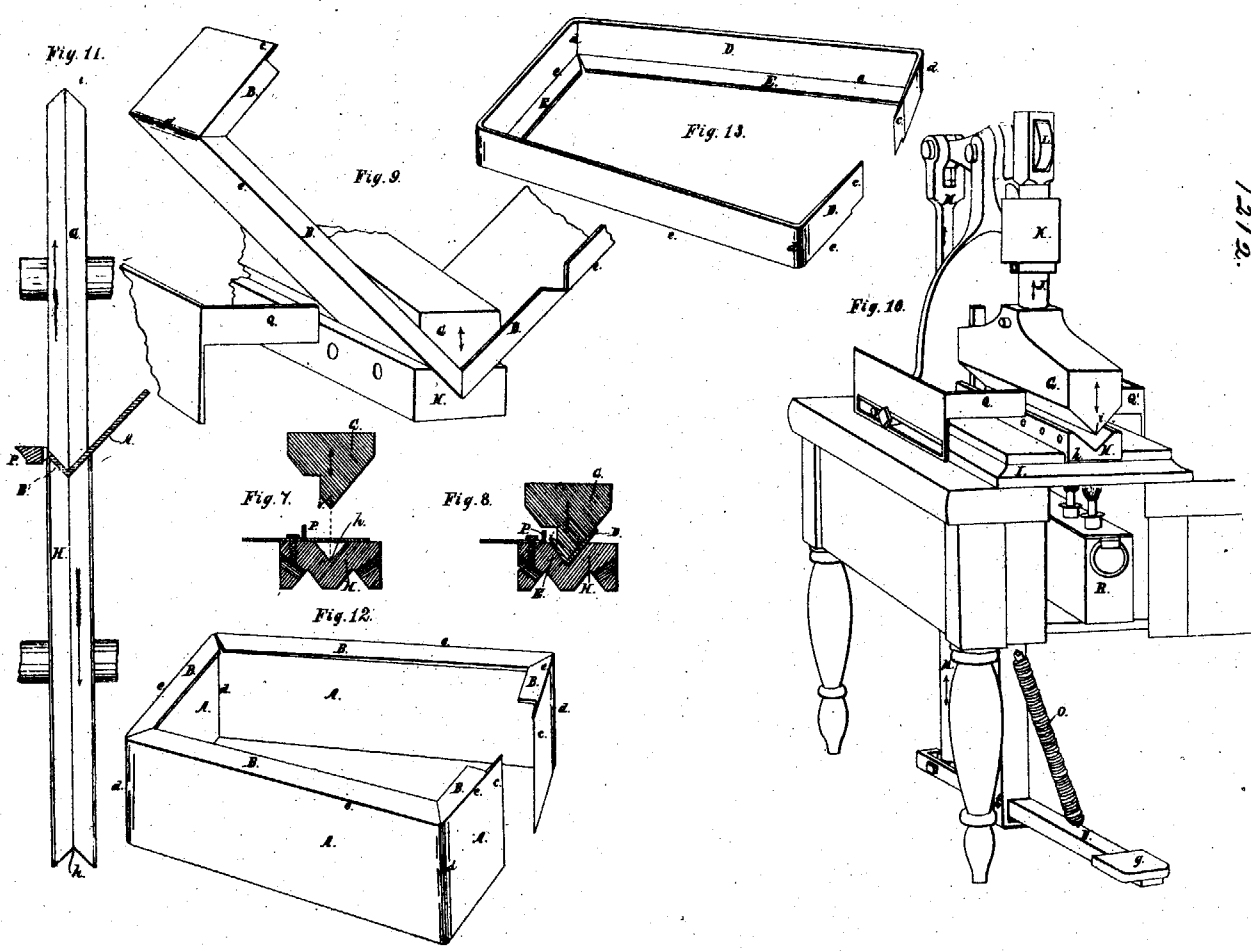

UNITED STATES PATENT OFFICE.

ELISHA WATERS, OF TROY, NEW YORK.

IMPROVEMENT IN MAKING PAPER BOXES.

Specification forming part of Letters Patent No. 19,270, dated February 2, 1858; Reissue No. 1,212, dated July 9, 1861.

*To all whom it may concern:*

Be it known that I, ELISHA WATERS, of the city of Troy, county of Rensselaer, and State of New York, have invented a new and useful Improvement in Manufacturing Boxes from Thick Paper-Board, for which I did obtain of and from the United States of America Letters Patent bearing date the 2d day of February, 1858, which Letters Patent have been duly surrendered for the purpose of correcting errors in the specification thereof, therein incorporated through accident and mistake; I therefore hereby declare that the following is a full and exact description of my invention relating to said paper boxes.

The nature of my invention consists in an improved mode of manufacturing angular boxes of and from thick paper-board by cutting the board into strips for the sides, and into suitable pieces for the top and bottom, so as to form the upright angles or corners successively, by pressing the said strips or parts between angular dies, heated or cold, as desired, which may be somewhat facilitated by cutting, creasing, or scoring the same, which strips for the said sides are then cemented together at the ends thereof, after which the top and bottom pieces or parts are firmly secured in and to the said side parts, as hereinafter described and set forth, thus and thereby forming the main part of any paper box and the top or cover thereof, which, when done, complete a strong and durable paper box.

Like letters represent like parts.

To enable others skilled in the art to which my invention relates to construct and use the same, I will here proceed to describe the mode and operation of manufacturing angular paper boxes.

Figures 1 and 2 represent a rectangular box constructed in the manner and by the machinery hereinbefore and hereinafter described and set forth.

Fig. 3 represents a strip or piece cut of suitable width and length to form each and every side of the box. This strip or piece has flanges B upon one edge thereof, to the inner side of which flanges the bottom C is firmly secured by cement or otherwise.

Fig. 4 represents a strip or piece corresponding from and by which the sides of the cover are made in like manner as the sides of the main or body part or section of the box represented by Fig. 3. The top F is therein firmly secured in like manner as the bottom C, above set forth and more fully described hereinafter. To enable the flanges to meet upon or near a miter-joint at the respective corners of the box, suitable notches, *a*, are cut therein for that purpose. The notches *b* are cut therein so as to allow the ends of said flanges to meet without hinderance when the chamfered ends *c* are lapped upon each other so as to cement and thus and thereby complete the sides of the main section or part of the box, or the sides of the cover for the same.

In this mode of making paper boxes I use a male and female die of the character shown at G and H in the different figures of the drawings. These dies or their equivalents are used for the purpose of successively forming the angles or corners of any paper box so that the same shall be strong and durable, which dies may be used in a heated or cold condition for this purpose, as deemed best by the operator or manufacturer. When the said angles or corners are thus turned or formed, they are then and thereafter pressed, thereby adding strength and giving them a better appearance.

In making a paper box of the character shown by Figs. 1 and 2, the strips or pieces for the sides thereof are prepared as shown at Figs. 3 and 4. Then and thereafter the flanges B and E are turned upon or formed into any required and convenient angle, and when turned upon or formed into a right angle will be as shown at Figs. 5 and 6, 8 and 11, which to accomplish I use the straight block-dies shown at Figs. 7, 8, 9, and 10, or the rotating circular dies seen at Fig. 11, or the equivalents of either or both, whereby the same mode of constructing boxes is carried out or executed. The straight dies may be mounted in any power-press, as shown at Fig. 10, in any such manner as to allow the said paper-board to be freely inserted between the same, as seen at the said Fig. 10, also at Fig. 7, which dies are then and thereafter brought to any required pressure against and upon the said paper-board thus inserted between said dies, thereby forming the desired angle, in the manner as hereinbefore stated.

In using the straight or block dies G and H they are so arranged as to accurately fit each other, one being a male and the other a female. Then either or both may be made to operate as required in order to construct or form a strong angle out of and upon the material placed between the same for the sides of any box, by the use and arrangement of any machinery which will accomplish the desired end, which may be as represented at Fig. 10. The said dies must be brought together upon the paper-board under any pressure which will accomplish the work in a correct and satisfactory manner.

In using circular dies I mount them in respect to each other as shown at Fig. 11, with their journals turning in fixed or yielding boxes, which may be adjusted so as to allow various thicknesses of paper-board between them for the purpose of forming angles or corners. These dies may move separately or both move together with the same speed. P is an adjustable guide, against which the edge of the paper-board is placed in turning or forming the flanges, &c.

After turning or forming the flanges upon the required edge of the said strips or pieces for the said respective sides of the said box, I then form or turn the vertical corners or angles *d* in succession by means and use of the block-dies or their equivalents, in the manner shown at Fig. 9, so that these parts of the said box appear as shown at Figs. 12 and 13. Q Q′ are guides to place the back edge of the paper-board against in turning or making the corners *d*. Then the ends *c*, which before have been prepared by chamfering the same, are finally cemented together by any material which will do the same. Then the top and bottom pieces, F and G, are each placed in their respective places and there securely fastened by the use of any cementing material, which completes the construction of my improved paper box.

Paper boxes of any required or desired number of sides and angles may be constructed in the manner aforesaid, which to do requires dies to correspond to and with the angle or corner desired. These dies may be made of cast or wrought iron, or of any other material to answer the same purpose, and when heated for use may be of any desired temperature, and may thus be heated by means of the alcohol-lamp R under the female die, as shown at Fig. 10, or by any other means. If the said paper-board is very thick or unusually dry it should be moistened somewhat by means of water before turning or forming the angles or corners, as aforesaid.

By this mode of making paper boxes any required number of different sizes and with many sides may be manufactured by the use of a simple set of the said dies and with the least waste of the paper-board, with smooth, solid, and upright corners, whereby the said boxes are greatly stiffened and rendered much stronger than otherwise made.

Paper boxes constructed as hereinbefore set forth are cheaper, stronger, and more durable than otherwise constructed, and at the same time require less waste of the paper-board and less amount of labor in constructing the same.

Goods or merchandise—such as collars, shirts, bosoms, drawers, lace, and the like—may be packed for market in such paper boxes with more safety and security than in any other kind. They may thus be adapted to any use when required.

Having thus described my invention and improvement in paper-boxes, what I claim, and desire to secure by Letters Patent, is—

1. Angular boxes of paper-board constructed by cutting the said board into strips or pieces for the sides and into parts for the top and bottom thereof, forming the upright angles or corners one by one by pressing the said strips or pieces between male and female dies corresponding to and with the angle or corner to be turned or formed, substantially as herein described and set forth.

2. The flanges B and E, formed upon the sides A and D by pressing the paper-board or strip between dies, (in proper form,) thus and thereby constructing said flanges to receive and combine the same with the top or bottom of the said box, as herein described and set forth.

3. Forming the corners of paper boxes by pressing the same between cold or hot dies constructed for that purpose, as herein described and set forth.

In testimony whereof I have, on this 9th day of March, 1861, set my hand.

ELISHA WATERS.

Witnesses:

SAMUEL PIERCE.

M. H. GRATTON.